Jan. 4, 1972     P. R. GUSTAFSON     3,632,519
AQUEOUS SOLUTIONS OF ω-AMINOALKYL ALKYLSULFONES
AS REGENERATIVE $CO_2$ ABSORBENTS
Filed Nov. 10, 1969     3 Sheets-Sheet 1

INVENTOR

PAUL R. GUSTAFSON

INVENTOR
PAUL R. GUSTAFSON

> United States Patent Office 3,632,519
Patented Jan. 4, 1972

3,632,519
AQUEOUS SOLUTIONS OF ω-AMINOALKYL ALKYLSULFONES AS REGENERATIVE CO₂ ABSORBENTS
Paul R. Gustafson, Washington, D.C., assignor to the United States of America as represented by the Secretary of the Navy
Filed Nov. 10, 1969, Ser. No. 875,001
Int. Cl. A61l 9/08; B01d 47/02
U.S. Cl. 252—189  3 Claims

ABSTRACT OF THE DISCLOSURE

Aqueous solutions of ω-aminomethyl $C_2$–$C_6$ alkylsulfones are useful as absorber solutions for removing carbon dioxide in the purification of air in scrubber systems.

STATEMENT OF GOVERNMENT INTEREST

The invention described herein may be manufactured and used by or for the Government of the United States of America for governmental purposes without the payment of any royalties thereon or therefor.

This invention relates to a process of absorbing carbon dioxide with an aqueous solution containing an amine additive for promoting absorption of the carbon dioxide in scrubber systems which are useful for the purification of the atmosphere aboard submarines or in closed spaces.

BACKGROUND OF THE INVENTION

In the purification of the atmosphere aboard nuclear submarines as presently practiced, an aqueous solution of monoethanolamine (MEA) is used in the scrubbers for absorption of carbon dioxide from the ambient air.

The scrubber aboard nuclear submarines comprises an absorber section having a tower which contains the aqueous solution of the amine (monoethanolamine) and a regeneration section including heat-exchangers and a stripper (reboiler) for driving out the carbon dioxide from the used absorbing solution and cooling the stripped solution prior to recycling it to the absorber section. In operation of the scrubber system, the atmosphere aboard the submarine is pumped through the absorption tower containing the aqueous solution of MEA and the resulting solution containing the formed amine carbonate is delivered to the heat exchangers which preheats it and then to the stripper where it is heated to boiling under pressure to cause release of carbon dioxide therefrom. This carbon dioxide is pumped overboard. The regenerated MEA solution is cooled by passing through appropriate heat exchangers and returned to the absorber section for further removal of carbon dioxide from the atmosphere of the submarine. The process of absorbing, stripping, cooling and recycling is continued until the carbon dioxide content of the submarine's atmosphere has been reduced to an adequately low level which may be about 1% by volume.

While monoethanolamine (MEA) in water solution has been a practical agent for the purification of the atmosphere of submarines it presents a problem in lack of stability to oxidation under operating conditions normally encountered in the scrubbers. Oxidation of the MEA results in the evolution of ammonia in noticeable amounts which cannot be tolerated in the submarine's atmosphere. MEA the regenerative CO₂ absorbent currently employed in the CO₂ scrubbers on submarines has several limitations in this use. The more important limitations are its relatively high vapor pressure, toxicity, NH₃ evolution, foaming, poor resistance toward oxidation, and low regeneration efficiency.

Pat. No. 3,372,981 sets forth a well known stripper useful on nuclear submarines and is directed to a MEA solution to which an additive has been added to overcome the problem of oxidative breakdown of the MEA solutions due to trace amounts of copper and iron compounds. This invention makes use of the same well known scrubber, therefore, the scrubber will not be shown or fully described in this disclosure.

STATEMENT OF THE OBJECTS

It is an object of the present invention to provide a method of purifying the atmosphere aboard submarines in which the aqueous absorber solution used in the scrubbers contains an amine additive for the absorption of carbon dioxide which has a greater oxidation stability in the operation of the regenerative scrubber system than monoethanolamine.

SUMMARY OF THE INVENTION

The above and other objects are accomplished following the present invention in which the aqueous solution for use in the scrubbers of the regenerative system for absorption of carbon dioxide from the ship's atmosphere is a solution in water of an ω-aminomethyl alkyl sulfone of the formula:

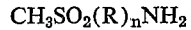

$$CH_3SO_2(R)_nNH_2$$

wherein R is an alkyl group which may be branched, straight chain, or alicyclic and n is an integer from 2 to 6. These ω-aminomethyl alkyl sulfones include 2-(methylsulfonyl)ethylamine, 3-(methylsulfonyl)propylamine, 2-(methylsulfonyl)isopropyl amine, 4-(methylsulfonyl)butyl amine, 5-(methylsulfonyl)amylamine, 6-(methylsulfonyl)hexyl amine, etc. These solutions may be prepared by oxidation of the corresponding methylthioalkylamines with hydrogen peroxide following the method of Brighton, K. W., and Reed, E. E., J. Amer. Chem. Soc. 65, 458 (1943); with potassium permanganate in hydrochloric acid medium following the method of Schneider, W., Liebigs Annalen der Chemie 375, 207 (1910), or with barium permanganate in water following the method of Mylius, W., Ber. 49 1091–99 (1916).

In the practice of the method of the invention, the concentration of the ω-aminomethyl alkyl sulfones in the aqueous solutions in the scrubbers is not critical and may range from about 3 to 5 normal. The method of the invention may be practiced in the manner for operating regenerative scrubber systems presently used aboard nuclear submarines for purification of the atmosphere and using monoethanolamine-water solution as the absorbent for carbon dioxide from the air.

DESCRIPTION OF DRAWINGS

The invention will be better understood from the following description when read in conjunction with the accompanying drawings in which.

DESCRIPTION OF THE INVENTION

This invention is directed to the use of aqueous solutions of an ω-aminomethyl alkyl sulfone (MSP) as an improved regenerative $CO_2$ absorbent for use in the $CO_2$ scrubbers on submarines. By way of explanation, the MSP is compared with MEA which is well known in the art and presently used aboard submarines. MSP is a strongly alkaline compound which is not volatile in steam, possesses a melting point of 44° C. and can be distilled at 165 to 168° C. at 6 mm. without decomposition.

Figure 1:
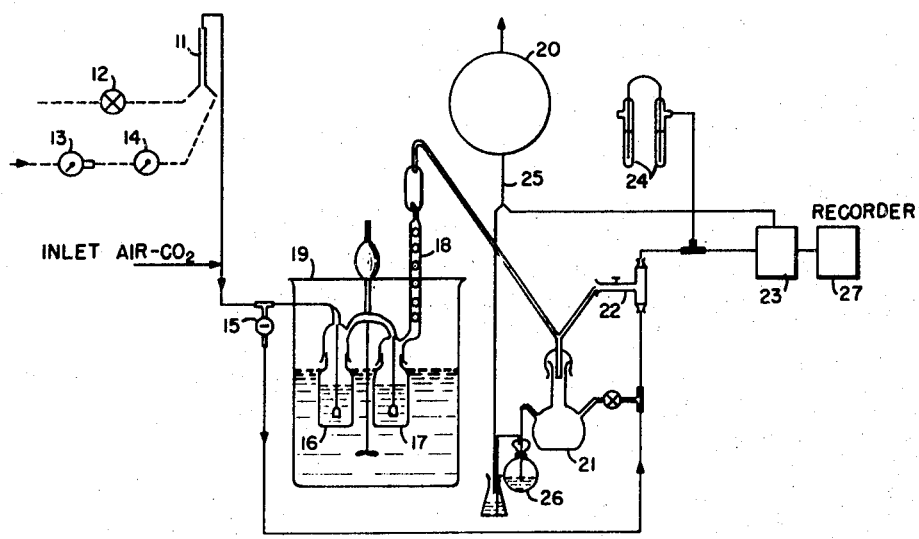
FIG. 1 is an apparatus for making comparative CO₂ absorption tests.
Figure 2:
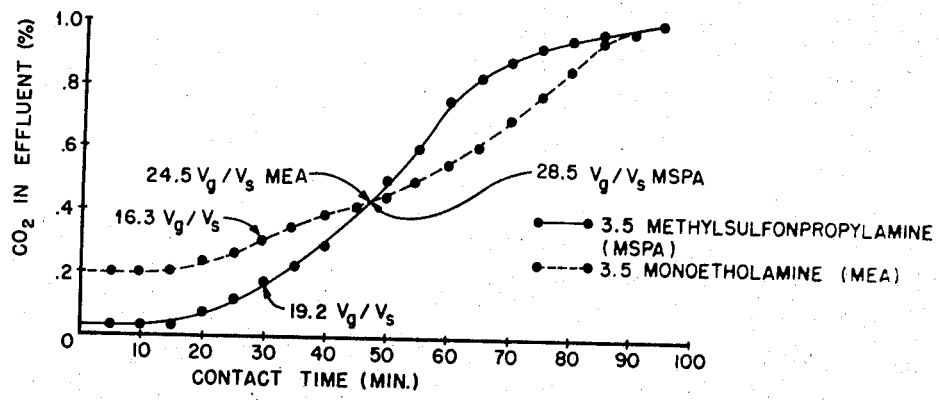
FIG. 2 is a set of curves depicting the results of absorption of carbon dioxide from sample air under comparable conditions using, respectively, a water solution of monoethanolamine and of ω-aminomethyl alkyl sulfone of the above defined group as the aqueous absorbent for the carbon dioxide.
Figure 4:
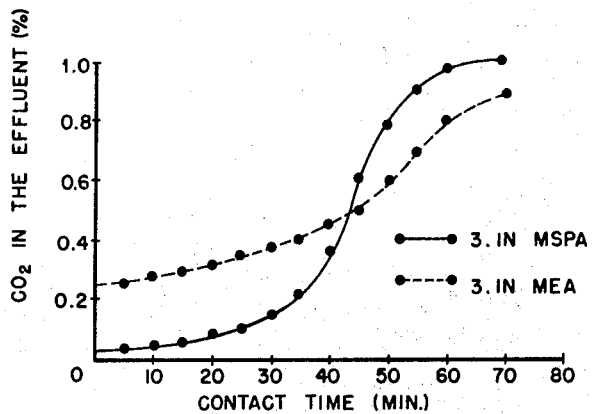
FIG. 4 is a set of curves depicting the results of absorption of carbon dioxide from sample air using the stripped solutions of FIG. 3 under comparable conditions.

In obtaining the results of comparative tests depicted by the curves in FIGS. 2 and 4, apparatus such as shown in FIG. 1 was used. The apparatus includes a precision bore flowrator 11 through which air mixed with $CO_2$ passes. The $CO_2$ may be admitted through a control valve 12 and the air may enter through an air inlet main line pressure reducer and filter 13 and controlled by a pressure regulator 14. From the flowrator 11, the $CO_2$ air mixture passes through a two-way valve 15 which normally passes the mixture through the main system or may be used as a by-pass. From the two-way valve, the $CO_2$ air mixture passes through two 125-ml. gas washing bottles 16 and 17 thermostated at 88° C. The first bottle (16) contains distilled water and saturates the gas stream, and the second bottle (17) contains 50 ml. of the amine solution being investigated (sample depth of 6 cm.). The gaseous effluent then passes through a small condenser 18 and through a 250-ml. round bottom flask 21 which divides the gas stream into two fractions. The main gas stream passes through a wet test meter while the smaller fraction (ca. 600 ml. per minute) passes through a needle valve 22 and on to a Liston-Becker $CO_2$ analyzer 23. The gas pressure drop through the Liston-Becker analyzer is maintained at 2 cm. of water maximum by a water-filled pressure relief 24. After passing through the $CO_2$ analyzer, the gas points the main effluent stream 25. The wet test meter, therefore, measures the entire gas flow. The $CO_2$ concentration of the influent gas stream is periodically checked by diverting the gas momentarily through the sample by-pass to the $CO_2$ analyzer. Dilute $HClO_4$ placed in the round bottom flask 26 is back-titrated with standard NaOH solution to determine the amine carryover. Loss of amine from the sample vessel is essentially zero.

FIG. 2 illustrates a comparison of the $CO_2$ absorption rate of a MSP-$H_2O$ mixture with a MEA-$H_2O$ mixture using a flow rate of 3.3 l./min. of 1% $CO_2$ in air at 88° C. with a 100% relative humidity (RH) and at one atmosphere. The results of the comparative runs depicted by the curves illustrates that the rate of $CO_2$ absorption for MSP is superior to that of MEA. The curve has indicated thereon comparative units of volumes of $CO_2$ (vg.), per volume of solution (vs.). As shown, the absorption by MSP was greater than for MEA. The data shown in FIG. 2 was obtained by use of the system shown in FIG. 1.

Figure 3:
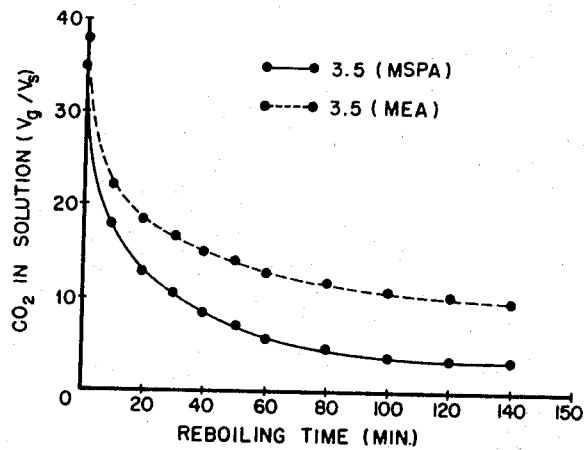
FIG. 3 is a set of curves depicting the results of stripping under comparable conditions with heat and nitrogen as a carrier gas, the solutions of FIG. 2 resulting from the absorption of carbon dioxide from the sample air.

Important properties that must be considered when evaluating a regenerative absorbent are the time and energy required for stripping the solution of $CO_2$. FIG. 3 illustrates the stripping properties of MEA and MSP. The data for FIG. 3 was obtained by refluxing a single 50-ml. sample of each solution. In the stripping process the system was purged by nitrogen gas at a flow rate of 500 cc./min. at one atmosphere. The flow of nitrogen over the surface of the solution was to insure transport of the evolved $CO_2$ away from the gas/liquid interface.

In each instance the 50 ml. sample was used in an oil bath at 125° C., with a reboiling time of 140 minutes. The curves illustrate that on stripping MSP evolves $CO_2$ faster than MEA. The amount of $CO_2$ in solution at the start was 40 vg./vs. units and as shown, MSP lost 27 vg./vs. units, while MEA evolved 22 vg./vs. units for the same 30 min. period. Further, the residual $CO_2$ after stripping (under the same conditions) was lower for MSP with a regeneration of about 92% with about 75% for MEA.

The time and energy for stripping the $CO_2$ was carried out by the use of a well known system. The $CO_2$ was absorbed by 100 ml. of 2.5 N sodium hydroxide solution which was renewed periodically. $CO_2$ not absorbed by the caustic was trapped by tared ascarite tubes and weighed. The $CO_2$ absorbed by sodium hydroxide was determined by titration with HCl to phenolphthalein and methyl orange end points as set forth in "Textbook of Quantitative Inorganic Analysis" Kolthoff, I. M. and Sandell, E. B., revised edition, New York: MacMillan, pp. 556–558, 1964. $BaCl_2$ was added to the caustic before the titration to precipitate the carbonate. The precipitate, however, was not removed from the solution. Titration to the phenolphthalein end point measured the amount of excess sodium hydroxide; titration to the methyl orange end point (after blank corrections) measured the absorbed $CO_2$. Therefore, the $CO_2$ evolved from the amine during the time interval under consideration was the sum of the $CO_2$ titrated in the sodium hydroxide solution and the $CO_2$ weighed in the ascarite tube associated with that interval.

The energy required for regeneration was evaluated by measuring the inlet and outlet water temperatures of the reflux condenser. The difference between them was consistently 6° C. for a water flow rate of 70 cc. per minute. This amounts to a heat input of approximately 420 cal. per minute for both amines. To minimize heat losses, the condenser was insulated by wrapping the jacket with three layers of asbestos tape.

FIG. 4 illustrates the effect of the initial stripping cycle on the second absorption cycle by relating the amount of $CO_2$ in the effluent by percent vs. the contact time in minutes. In determining the indicated values a flow rate used for each of the chemical compounds was 3.3 l./min. of 1% of $CO_2$ in air at 88° F. and 100% RH at one atmosphere. A comparison of the curves of FIG. 4 with that of the initial test as shown in FIG. 2 illustrates the advantage of the nearly complete regeneration of MSP shown by the curves of FIG. 3. The normalities of each solution used in obtaining the curves shown in FIG. 4 due to necessary dilutions after previous samplings were lower than the solutions used in obtaining the curves of FIG. 2. However, the $CO_2$ absorption efficiency of MSP remained essentially unchanged for a period of 35 minutes, whereas for MEA the $CO_2$ in the effluent was 1.5 times that of the original 3.5 N MEA after only 15 minutes time.

Figure 5:
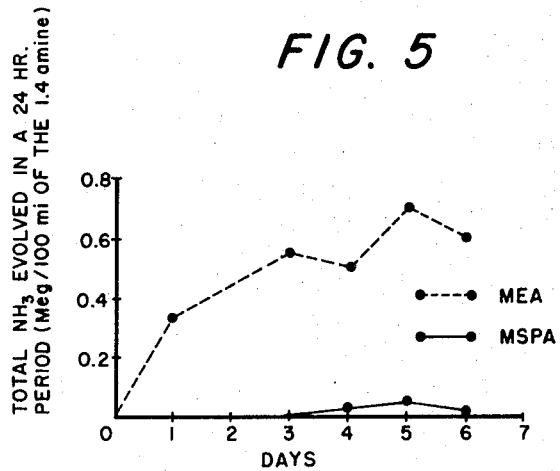
FIG. 5 is a set of curves depicting the results under comparable conditions of a dynamic test on the oxidation stability of an aqueous solution of monoethanolamine and of ω-aminomethyl alkyl sulfone as defined above.

As pointed out previously oxidation stability has a large bearing on the effectiveness of the chemical compound and subsequently the effect on personnel confined to a submarine. Therefore, the relationship of oxidation stability between MSP and MEA is shown in FIG. 5. FIG. 5 illustrates a dynamic test of stability using a flow rate of 100 ml.%min. of 2% $CO_2$ in air at 55° C. for each of the chemical compounds MEA and MSP. As shown, the only significant evolution of $NH_3$ from MSP occurred after 4 days, and the rate at that time was only about 4% as great as it was for MEA. It was also determined that the normality loss for the 6 day test period shown amounted to 1.4% for MSP and 16% for MEA.

The following table summarizes various critical properties of MSP relative to MEA.

| Property | MEA | MSP |
| --- | --- | --- |
| Volatility | High, 760 mm. (170° C.). | Low, 6 mm. (168° C.). |
| $CO_2$ absorption rate (relative) | 1 | 0.9. |
| $CO_2$ capacity (relative) | 1 | 0.9. |
| Stripping rate (relative) | 1 | 1.3 (at 30 min.). |
| Oxidation stability | Poor | High. |
| Melting point of 4 N solution | −12° C | −17° C. |
| Thermal stability | Poor | Stable to 180° C. |
| Alkalinity (relative) | 1 | <1. |
| Odor | Ammoniacal | Low. |
| Foaming tendency | Fair | Poor. |

It is obvious from the date illustrated by FIGS. 2–5 that MSP is superior to MEA since it has a low volatility, a high thermal stability, with an excellent oxidation resistance.

A description of the apparatus used for comparative absorption test, the process for stripping and the dynamic test for stability is found in NRL Report No. 6517 dated Aug. 25, 1966 by P. R. Gustafson and the test data curves may be found in NRL Report No. 6926 dated July 23, 1969 by Paul R. Gustafson and R. R. Miller.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An improved regeneration $CO_2$ absorbent aqueous solution for use in the scrubbers of a regenerative system for absorption of carbon dioxide from the atmosphere of a submarine or any other confined area wherein the improved aqueous solution conststs of an ω-aminomethyl alkylsulfone of the formula:

$$CH_3SO_2(R)_nNH_2$$

wherein R is an alkyl group which may be branched, straight chain or alicyclic and $n$ is an integer from 2 to 6.

2. An improved regenerative $CO_2$ absorbent as claimed in claim 1 wherein the ω-aminomethyl alkyl sulfone include:

2-(methylsulfonyl)ethylamine, 3-(methylsulfonyl)propylamine, 2-(methylsulfonyl)isopropyl amine, 4-(methylsulfonyl)butyl amine, 5-(methylsulfonyl)amylamine, and 6-(methylsulfonyl)hexyl amine.

3. An improved regenerative $CO_2$ absorbent as claimed in claim 1 wherein the ω-aminomethyl alkyl sulfone is 3(methylsulfonyl)propylamine.

References Cited
UNITED STATES PATENTS

| | | | |
|---|---|---|---|
| 3,039,251 | 6/1962 | Kamlet | 23—2 |
| 3,352,631 | 11/1967 | Zarker | 23—150 |
| 3,372,981 | 3/1968 | Ravner et al. | 252—189 |
| 3,387,917 | 6/1968 | Walles et al. | 252—189 |
| 3,502,428 | 3/1970 | Golbein et al. | 252—189 |

RICHARD D. LOVERING, Primary Examiner

I. GLUCK, Assistant Examiner

U.S. Cl. X.R.

23—24 A, 24, 150; 55—68